UNITED STATES PATENT OFFICE 2,649,471

PROCESS FOR PREPARING METHINE DYES

William W. Williams, Easton, Pa., and Albert F. Strobel, Phillipsburg, N. J., assignors to General Aniline & Film Corporation, New York, N. Y., a corporation of Delaware No Drawing. Application November 6, 1950, Serial No. 194,382

5 Claims. (Cl. 260—465)

This invention relates to a novel method of preparing methine dyestuffs which correspond to the general formula:

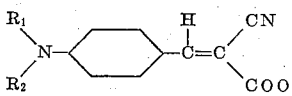

wherein R, $R_1$ and $R_2$ represent lower alkyl radicals.

Dyestuffs of the aforementioned type have heretofore been prepared by refluxing, in an inert organic solvent medium, a para-dialkylamino benzaldehyde of the formula:

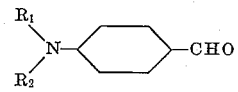

with a cyanoacetic acid alkyl ester of the formula:

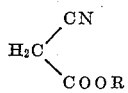

wherein R, $R_1$ and $R_2$ have the values given above, in the presence of a small amount of piperidine, followed by cooling whereby the desired methine condensation product crystallizes out, filtering, washing and drying. This product is then usually purified by recrystallization from solvent media and drying, after which it is reduced to a dry powder by grinding with dispersing agents, etc. This typical process is disclosed, for example, in Patents 1,950,421 and 2,206,108. Such a process is open to objection for various reasons. Excessive kettle space relative to the volume of reactants is required because of the large volume of inert solvent employed. Crystallization is a time-consuming and tedious operation, as well as filtration, washing and drying. The use of an inert solvent is costly, in addition to presenting fire and health hazards and various technical difficulties. Recrystallization requires the use of additional solvent.

It is among the objects of this invention to provide a process for preparing the aforementioned methine dyestuffs which is substantially quantitative, simple, efficient and economical, and which will eliminate substantially all of the objections applicable to the presently employed processes. Other objects will become apparent from the following description of our invention.

We have found that the reaction can be run almost quantitatively by condensing the reactants in the absence of an inert solvent at a temperature sufficient to maintain the starting products and the reaction product in a liquid condition until the condensation is completed. Piperidine or similar compound is necessary as a catalyst for efficient reaction. By the use of our new method larger charges can be run in the same kettle space since the volume is reduced considerably. Slow crystallization, filtration, washing and drying are eliminated, as well as the increased fire and health hazards and cost of using solvents. The dyes obtained have dyeing properties (such as light-fastness, washfastness, exhaustion from dye bath, yield, degree of dispersion, and tar test) as good as, or better than, the corresponding dyes prepared by the solvent method. In some cases, brighter shades are obtainable in fabrics dyed therewith. Because of the high efficiency of the condensation, which is almost quantitative, purification steps such as washing, extraction and recrystallization, are unnecessary. When the condensation has been completed at the required temperature, the mass need only be cooled to solidify and ground with dispersing, emulsifying and/or wetting agents and the like to produce the finished dyestuff powder.

The invention is further illustrated by the following examples, although it is to be understood that they are illustrative and not limitative. Parts are by weight unless otherwise specified.

Example 1

250 g. of crude p-diethylamino benzaldehyde (71%) was melted on a steam bath, warmed to 75° C., and filtered through a Büchner funnel. 21 g. of insoluble material remained on the filter paper. The filtrate was transferred to a 1-liter round-bottomed flask, warmed to 80° C. and 4.0 g. of piperidine was added. With good agitation, at 80–90° C., 113 g. of ethyl cyanoacetate was dripped in over a 2-hour period. The material was stirred 1 hour longer at 80° C. after complete addition of the ethyl cyanoacetate, then stirred 3 hours at 95° C. The molten mass was poured on a flat dish and it set up to a hard mass in a short time. 302 g. of material were obtained which consisted of the substantially pure compound represented by the formula:

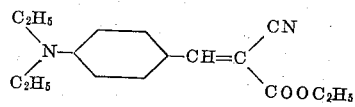

100 g. of this material was placed in a Werner-Pfleiderer mixer and to it was added 50 g. of "Flotite" Dry (an alkaline secondary extract of licorice root) and 50 g. Aquanol SO (sodium salt of a sulfonated long chain alcohol sold by the Beacon Company). Agitation was started, then 40 g. water added, giving a thick mass for kneading. The mill was run for 3 hours until the product was dry. 190 g. of dispersed material was recovered from the mill.

The product had dyeing properties equal to those of the product produced by the solvent method.

*Example 2*

250 g. of p-diethylamino benzaldehyde (71%) was placed in a 1-liter round-bottomed flask and to it was added 100 g. of methyl cyanoacetate. Over a ½ hour period the mixture was warmed to 70° C. At 70° C., over a 1 hour period 4 g. of piperidine was gradually added, keeping the temperature at 70° C. by alternate heating and cooling. Then the temperature was raised to 95° C. and maintained at this point for 3 hours. The molten mass was poured on a flat dish, cooled to room temperature, and crystallization initiated by scratching the side of the dish. The material gradually crystallized to a hard mass which consisted of the substantially pure compound represented by the formula:

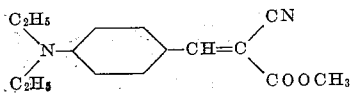

Dispersion was carried out in the same way as in Example 1.

The product dyed cellulose acetate in a greener, brighter shade than did the analogous product prepared using the solvent method. Light-fastness, dispersion, and tar tests were correspondingly equal in both products.

The process as described hereinbefore may be modified and/or adjusted as appears hereinafter.

Since the condensation is practically quantitative, substantially equimolar proportions of the reactants should be employed. Proportions outside of this range are undesirable as the amount of reactant in excess of these proportions would remain unreacted and would require removal from the finished product by otherwise unnecessary purification procedures.

In general, temperatures of 70° to 110° C. prescribe the outside operative limits. Too low a temperature would result in separation of one of the starting products or reaction product before the condensation has been completed. Too high a temperature would tend to distill off a part of the reaction mixture which would be undesirable in throwing the reaction out of equilibrium. Such unduly high temperatures have likewise been found to produce dyes giving duller shades. The optimum temperature in any particular instance will obviously be dependent mainly upon the melting points and intrasolubilities of the components of the reaction mixture. Part of the water resulting from the condensation will vaporize out of the reaction mixture during the condensation, but any residual amount of water remaining in the hardened mass would not be detrimental to the properties of the finished dyestuff.

The length of itme of the heating operation necessary to carry the condensation reaction to completion will depend mainly upon the nature of the components of the reaction mixture and the temperature employed. Usually about three hours of heating after all of the components of the reaction mixture have been added are sufficient to produce a complete condensation, although heating for somewhat longer periods would not be detrimental.

Although piperidine is preferred as the catalyst because of its superiority with respect to increasing the speed of reaction and other catalytic properties, other substances may be used which would be operative. For example, there may be used diethylamine, alkali, alkali metal alcoholates, carbonates and acetates, pyridine and the like. The amount of catalyst employed must be sufficient to effect complete condensation between the entire amounts of reactants present. However, too large an amount of catalyst would necessitate removal of excess catalyst from the reaction product. Obviously, the minimum amount of catalyst operative to effect complete condensation is desirable. In general, about 2% to about 4% of piperidine on the weight of the benzaldehyde is adequate to produce the results desired. Other catalysts are used in equivalent amounts after proper adjustment.

Instead of the benzaldehyde employed in the examples, there may be used other lower p-dialkylamino benzaldehydes, such as para-dipropylamino benzaldehyde, para-dibutylamino benzaldehyde, and para-diethylamino benzaldehyde, in addition to the mixed benzaldehydes such as para-methylethylamino benzaldehyde, para-methylbutylamino benzaldehyde and other lower dialkyl combinations thereof. Ring-substituted benzaldehydes are likewise to be understood as included within the scope of the invention and claims provided the substituents are hydrocarbon and/or other inert groups which are not detrimental with respect to the desired reaction, solubility, melting point, properties of the reaction product, and the like. Instead of the methyl and ethyl cyanoacetates, there may be used other lower alkyl esters, such as the propyl and butyl cyanoacetates.

Since the cooled solid mass resulting from the condensation is in a substantially pure state, purification steps ordinarily necessary at this stage may be dispensed with and the solid mass ground directly into a finished dye powder in well known manner using dispersing, wetting and/or emulsifying agents and water. While an alkaline secondary extract of licorice root has been found very satisfactory, other similar assistants may be added thereto or substituted therefor. Alkaline assistants are to be preferred.

Our invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

We claim:

1. A process for producing a compound of the formula:

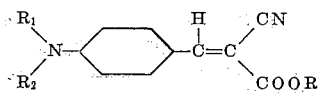

by heating a composition comprising substantially equimolar amounts of a compound of the formula:

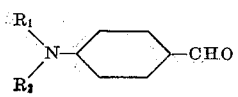

and a compound of the formula:

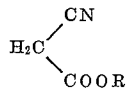

together with a small amount of an alkaline catalyst, in the absence of an inert solvent, at a temperature sufficient to maintain the starting products and reaction product in a liquid condition until the condensation is completed, R, $R_1$ and $R_2$ in the above formulae being selected from the group consisting of lower alkyl radicals.

2. A process for producing a compound of the formula:

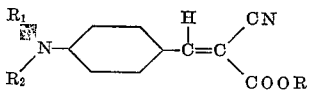

by heating a composition comprising substantially equimolar amounts of a compound of the formula:

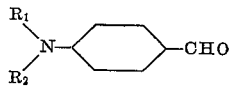

and a compound of the formula:

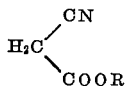

together with from about 2% to about 4% by weight of an alkaline catalyst on the weight of the benzaldehyde, in the absence of an inert solvent, at a temperature sufficient to maintain the starting products and reaction product in a liquid condition until the condensation is completed, R, $R_1$ and $R_2$ in the above formulae being selected from the group consisting of lower alkyl radicals.

3. A process for producing a compound of the formula:

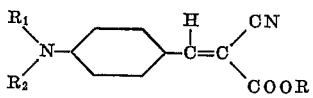

by heating a composition comprising substantially equimolar amounts of a compound of the formula:

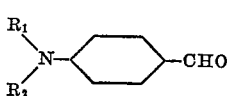

and a compound of the formula:

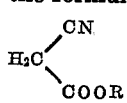

together with from about 2% to about 4% by weight of piperidine on the weight of the benzaldehyde, in the absence of an inert solvent, at a temperature sufficient to maintain the starting products and reaction product in a liquid condition until the condensation is completed, R, $R_1$ and $R_2$ in the above formulae being selected from the group consisting of lower alkyl radicals.

4. A process for producing a compound of the formula:

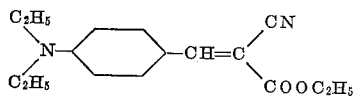

by heating a composition comprising substantially equimolar amounts of para-diethylamino benzaldehyde and ethyl cyanoacetate together with about 2% by weight of piperidine on the weight of the benzaldehyde, in the absence of an inert solvent, at a temperature sufficient to maintain the starting products and reaction product in a liquid condition until the condensation is completed.

5. A process for producing a compound of the formula:

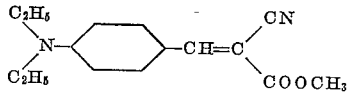

by heating a composition comprising substantially equimolar amounts of para-diethylamino benzaldehyde and methyl cyanoacetate together with about 2% by weight of piperidine on the weight of the benzaldehyde, in the absence of an inert solvent, at a temperature sufficient to maintain the starting products and reaction product in a liquid condition until the condensation is completed.

WILLIAM W. WILLIAMS.
ALBERT F. STROBEL.

References Cited in the file of this patent

UNITED STATES PATENTS

| Number | Name | Date |
|---|---|---|
| 1,950,421 | Wahl | Mar. 13, 1934 |

FOREIGN PATENTS

| Number | Country | Date |
|---|---|---|
| 606,962 | Great Britain | Aug. 24, 1948 |

OTHER REFERENCES

Adams et al., "Org. Reactions" (Wiley) vol. 1, pp. 234–235 (1942).